US010495726B2

(12) United States Patent
Pusch et al.

(10) Patent No.: US 10,495,726 B2
(45) Date of Patent: Dec. 3, 2019

(54) METHODS AND SYSTEMS FOR AN IMMERSIVE VIRTUAL REALITY SYSTEM USING MULTIPLE ACTIVE MARKERS

(71) Applicant: WorldViz, Inc., Santa Barbara, CA (US)

(72) Inventors: Matthias Pusch, Santa Barbara, CA (US); Masaki Miyanohara, Santa Barbara, CA (US); John T. Roessler, Santa Barbara, CA (US); Andrew C. Beall, Santa Barbara, CA (US)

(73) Assignee: WorldViz, Inc., Santa Barbara, CA (US)

( * ) Notice: Subject to any disclaimer, the term of this patent is extended or adjusted under 35 U.S.C. 154(b) by 0 days.

(21) Appl. No.: 15/934,137

(22) Filed: Mar. 23, 2018

(65) Prior Publication Data

US 2018/0306898 A1 Oct. 25, 2018

Related U.S. Application Data

(63) Continuation-in-part of application No. 15/797,599, filed on Oct. 30, 2017, now abandoned, which is a (Continued)

(51) Int. Cl.
*G06F 3/01* (2006.01)
*G01S 5/16* (2006.01)
(Continued)

(52) U.S. Cl.
CPC ............ *G01S 5/16* (2013.01); *G02B 27/0172* (2013.01); *G06F 3/011* (2013.01); *G06F 3/012* (2013.01);
(Continued)

(58) Field of Classification Search
CPC ............ G09G 5/10; G09G 5/00; G09G 5/377; G06Q 30/04; G06F 3/01; G06F 3/012; G06T 19/006; A61B 5/11; A61B 5/6803; A61B 5/6814; A61B 2017/00216; A61B 2090/502
(Continued)

(56) References Cited

U.S. PATENT DOCUMENTS 6,574,352 B1 6/2003 Skolmoski
6,720,949 B1 4/2004 Pryor et al.
(Continued)

OTHER PUBLICATIONS

U.S. Appl. No. 14/823,986, filed Aug. 11, 2015, Beall et al.
(Continued)

*Primary Examiner* — Diane M Wills
(74) *Attorney, Agent, or Firm* — Knobbe, Martens, Olson & Bear LLP

(57) ABSTRACT

A portable virtual reality and/or augmented reality system enabling the projection and tracking of a user in a simulated environment is described. A system of motion capture cameras/sensors, computing, and tracking devices is provided in a portable package. Each tracking device is configured with one or more emitters which may generate a distinctive, repetitive pattern. The virtual reality and/or augmented reality system once assembled, provides for motion tracking and display of a one or more users in a simulated environment.

7 Claims, 8 Drawing Sheets

Related U.S. Application Data continuation of application No. 14/937,400, filed on Nov. 10, 2015, now Pat. No. 9,804,257.

(60) Provisional application No. 62/079,406, filed on Nov. 13, 2014.

(51) Int. Cl.
 *G02B 27/01* (2006.01)
 *G06T 19/00* (2011.01)

(52) U.S. Cl.
 CPC ............ *G06F 3/014* (2013.01); *G06T 19/006* (2013.01); *G02B 27/0179* (2013.01); *G02B 2027/014* (2013.01); *G02B 2027/0138* (2013.01); *G02B 2027/0187* (2013.01)

(58) Field of Classification Search
 USPC .................................................. 600/587, 595
 See application file for complete search history.

(56) References Cited

U.S. PATENT DOCUMENTS

| | | | |
|---|---|---|---|
| 7,719,484 B2 | 5/2010 | Turner et al. | |
| 8,472,120 B2 | 6/2013 | Border et al. | |
| 8,482,859 B2 | 7/2013 | Border | |
| 8,570,378 B2 | 10/2013 | Zalewski et al. | |
| 8,806,354 B1 | 8/2014 | Hyndman | |
| 9,110,503 B2 | 8/2015 | Beall et al. | |
| 9,152,305 B2 | 10/2015 | Xu | |
| 9,153,195 B2 | 10/2015 | Geisner | |
| 9,159,168 B2 | 10/2015 | Elber | |
| 9,183,807 B2 | 11/2015 | Small | |
| 9,213,405 B2 | 12/2015 | Perez | |
| 9,541,634 B2 | 1/2017 | Beall et al. | |
| 9,595,298 B2 | 3/2017 | Lee | |
| 9,792,491 B1 | 10/2017 | Ramaswamy | |
| 9,792,714 B2 | 10/2017 | Li | |
| 2002/0036617 A1 | 3/2002 | Pryor | |
| 2004/0130566 A1 | 7/2004 | Banerjee | |
| 2008/0219566 A1 | 9/2008 | Teoh | |
| 2008/0310714 A1 | 12/2008 | Stern | |
| 2010/0070859 A1 | 3/2010 | Shuster | |
| 2010/0185124 A1* | 7/2010 | Bisbee, III | A61F 2/64 600/595 |
| 2010/0311512 A1 | 12/2010 | Lock | |
| 2012/0092328 A1 | 4/2012 | Flaks | |
| 2012/0156652 A1 | 6/2012 | Lane | |
| 2012/0178054 A1 | 7/2012 | Jomander | |
| 2012/0194419 A1 | 8/2012 | Osterhout et al. | |
| 2012/0194420 A1 | 8/2012 | Osterhout et al. | |
| 2012/0194549 A1 | 8/2012 | Osterhout et al. | |
| 2012/0194551 A1 | 8/2012 | Osterhout et al. | |
| 2012/0194552 A1 | 8/2012 | Osterhout | |
| 2012/0200601 A1 | 8/2012 | Osterhout et al. | |
| 2012/0206334 A1 | 8/2012 | Osterhout et al. | |
| 2012/0212406 A1 | 8/2012 | Osterhout et al. | |
| 2012/0212499 A1 | 8/2012 | Haddick | |
| 2013/0050426 A1 | 2/2013 | Sarmast | |
| 2013/0223679 A1 | 8/2013 | Russ | |
| 2013/0271457 A1 | 10/2013 | Haswell | |
| 2014/0064552 A1 | 3/2014 | Miyagi | |
| 2014/0152550 A1 | 6/2014 | Beall | |
| 2014/0361956 A1* | 12/2014 | Mikhailov | G02B 27/0179 345/8 |
| 2015/0193018 A1 | 7/2015 | Venable et al. | |
| 2015/0215581 A1* | 7/2015 | Barzuza | G06T 19/006 348/14.1 |
| 2015/0235426 A1* | 8/2015 | Lyons | G02B 27/0172 345/8 |
| 2015/0235434 A1 | 8/2015 | Miller | |
| 2016/0129346 A1 | 5/2016 | Mikhailov | |
| 2016/0189429 A1 | 6/2016 | Mallinson | |
| 2016/0239472 A1 | 8/2016 | Kasahara | |
| 2016/0262608 A1 | 9/2016 | Krueger | |
| 2016/0266644 A1 | 9/2016 | Yamamoto | |
| 2016/0321841 A1 | 11/2016 | Christen | |
| 2017/0038829 A1 | 2/2017 | Lanier | |
| 2017/0330362 A1* | 11/2017 | Sumner | G06T 13/20 |
| 2018/0306898 A1 | 10/2018 | Pusch | |
| 2018/0314323 A1* | 11/2018 | Mikhailov | G06F 3/012 |

OTHER PUBLICATIONS

Ambisonic 3D Auralizer System, WorldViz, LLC, 2 pages, Sep. 27, 2014, https://web.archive.org/web/20140927060932/http://www.worldviz.com/products/ambisonic.

Augmented Reality, WorldViz, LLC, 3 pages, Sep. 27, 2014, https://web.archive.org/web/20140927061320/http://www.worldviz.com/products/augmented-reality.

Head Mounted Displays, WorldViz, LLC, 2 pages, Sep. 26, 2014 https://web.archive.org/web/20140926011241/http://www.worldviz.com/products/head-mounted-displays.

Precision Position Tracking for Virtual Reality, WorldViz, LLC, 2 pages, Oct. 24, 2014, https://web.archive.org/web/20141024142530/http://www.worldviz.com/products/ppt.

Motion Tracking, World Viz, 4 pages, 2012.

Other VR Hardware, WorldViz, LLC, 15 pages, Sep. 27, 2014, https://web.archive.org/web/20140927061334/http://www.worldviz.com/products/other-vr-hardware.

"The WorldViz wireless 6Dof Wand controller is used to navigate in and interact within the 3D model," architecture interactive, 2 pages, 2012.

Vizard Virtual Reality Software Toolkit, 2 pages, Sep. 26, 2014, https://web.archive.org/web/20140924064245/http://www.worldviz.com/products/vizard.

* cited by examiner

METHODS AND SYSTEMS FOR AN IMMERSIVE VIRTUAL REALITY SYSTEM USING MULTIPLE ACTIVE MARKERS

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for creating a virtual reality and/or augmented reality environment.

BACKGROUND

The virtual reality market has expanded substantially over the last few years in response to advances in computing and stereoscopic displays.

Virtual Reality (VR) comprises a computer simulated environment that can simulate a physical presence in places in the real world or imagined worlds. Conventionally, current virtual reality environments are primarily visual experiences, displayed on a screen or through special stereoscopic display head gear. The simulated environments can be similar to the real world in order to create lifelike experiences or it differs significantly from reality, such as in VR games. Advantageously, virtual reality and/or simulated environments as described herein can be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for example, in an automotive virtual reality environment.

Augmented Reality (AR) generally refers to a computer simulated environment combined with the real world. Conventionally, the elements of the real world are augmented with computer generated graphics. Often, translucent stereoscopic headsets are worn by the user in AR simulations.

Historically, the interactive visualization and virtual reality industry has been fractured. A Company A may provide display head gear and a Company B may provide wearable position tracking technologies. Each of these companies generally provides specialized development execution software in association with their proprietary technologies. An issue for virtual reality content creators and virtual reality end-users (e.g., those end users putting into practice virtual reality to solve problems) is that they are generally responsible for systems integration of the separate technologies of the fragmented industry—a task for which virtual reality content creators and virtual reality end-users are ill-equipped to handle or is a distraction from their primary corporate objectives. Additionally, an interactive visualization environment (e.g., a virtual reality environment) generally includes a dedicated room, high ceilings, mounted cameras, lighting, cabling, computing servers, tracking devices, and specialized software for each hardware device, all appropriately configured to integrate in the dedicated environment. To see a demonstration of virtual reality content and to run real-time simulations with test subjects and/or interested parties, the subjects generally must travel to the dedicated interactive visualization environment. This lack of mobility increases virtual reality creators and virtual reality end-users' expense and creates significant barriers in the marketing and sales process. Thus, there is a need to provide a turn-key interactive real-time, visualization and simulation environment, comprising hardware and software components, which can be utilized by content creators and end-users to create immersive visualization experiences. In addition, there is a need to provide a portable implementation of said turn-key interactive real-time, visualization and simulation environment at the customer prospect's and/or end user's location.

As previously described, there are certain hardware/software challenges associated with virtual reality system integration for virtual reality content creators and virtual reality end-users. As the market of virtual reality expands, later adopters of virtual reality are less sophisticated and less patient then early adopters. Consequently, it is even more important that a turn-key interactive real-time, visualization and simulation environment be even more portable and easier to use out-of-the-box (or within the box, as further described below).

SUMMARY

An embodiment of a lightweight, compact, and portable virtual reality product kit includes one or more wireless tracking devices that works in conjunction with a tracking motion capture system. Advantageously, certain example virtual reality product kits described herein are optionally transportable by a user to different locations including by air transport as carry-on baggage.

Thus, described herein are devices and methods for creating a development environment and/or an execution environment for immersive visualization experiences, and to a turnkey virtual reality product kit supporting said development and/or execution environment, wherein the virtual reality product kit is optionally portable. Optionally, although certain embodiments may be turnkey, the turnkey system may be configured to enable a user to add additional components. Further, for certain embodiments, a user need not use all the components of the turnkey system. An aspect of this disclosure relates to a portable virtual reality kit, comprising: a computing device; a head mounted display; one or more handheld controllers; a plurality of motion tracking cameras, wherein the plurality of motion tracking cameras are configured, at least in part, to capture images comprising infrared light and to communicate image data with the computing device, and further wherein one or more of the plurality of motion tracking cameras are optionally affixed to a portable case wherein the portable case is configured to house at least the computing device, the head mounted display, and the one or more handheld controllers. Optionally, the portable virtual reality kit is configured to:

enable a virtual reality session for a user upon computing device boot wherein the user did not mechanically interconnect hardware devices or calibrate the motion tracking cameras. Optionally, based at least in part on a determined position corresponding to input from the tracking cameras, an orientation of a scene is enabled to be rendered in the head mounted display, wherein the orientation of the scene is synchronized with movement of the user.

DETAILED DESCRIPTION

Figure 1:
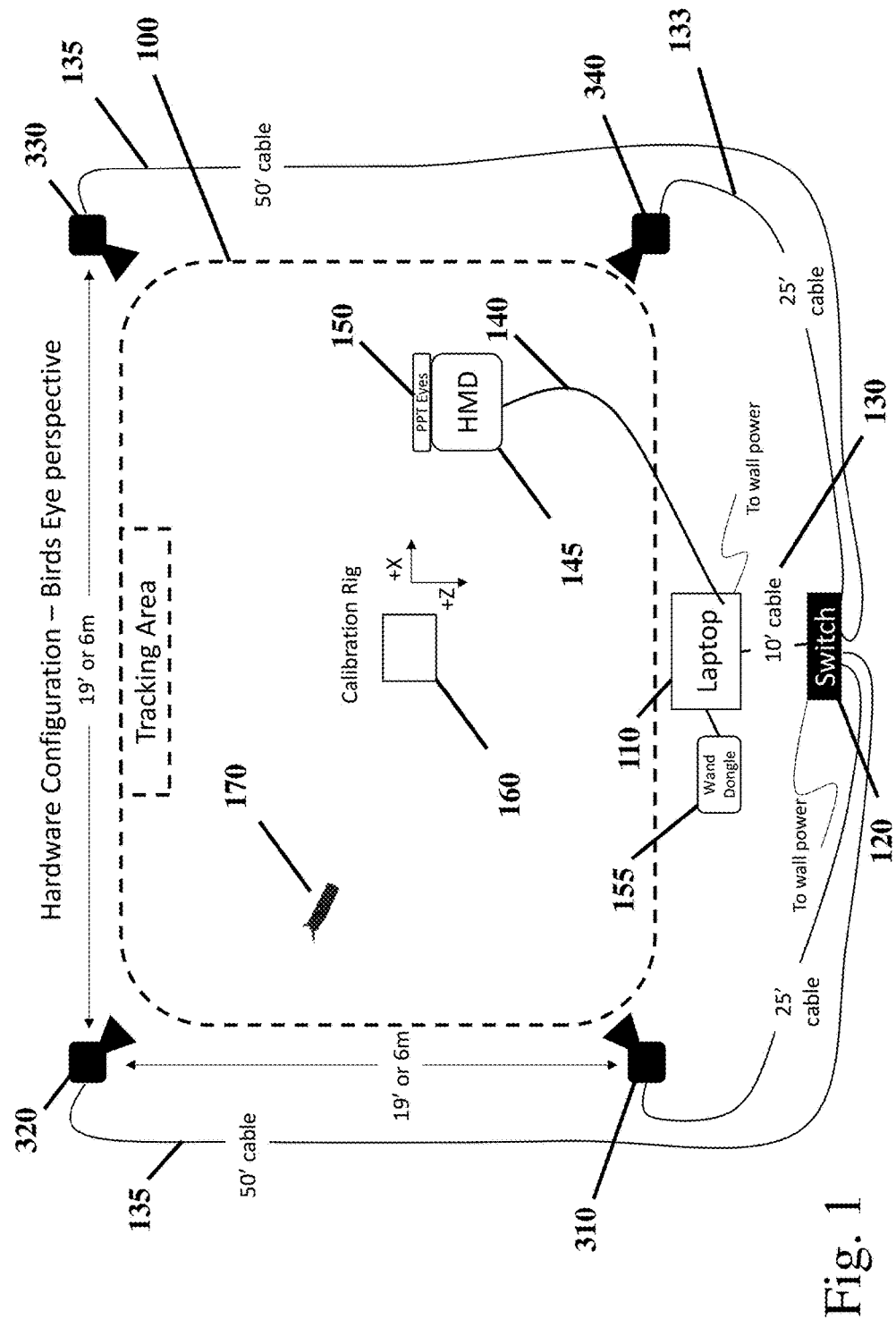
FIG. 1 illustrates an example embodiment of a portable virtual reality hardware configuration.

Described herein are devices and methods for creating a development environment and/or an execution environment for immersive visualization experiences, and to a turnkey virtual reality product kit supporting said development and/or execution environment, wherein the virtual reality product kit is optionally portable. Several example embodiments are illustrated herein including a High Performance Virtual Reality Kit I, High Performance Virtual Reality Kit II, High Performance Virtual Reality Box I (referred to herein as VizBox I), High Performance Virtual Reality Box II (referred to herein as VizBox II), and an Economical, Lower Cost, High Performance Virtual Reality Kit. Optionally, although certain embodiments may be turnkey, the turnkey system may be configured to enable a seller and/or user/operator to add additional components. Further, for certain embodiments, a user need not use all the components of the turnkey system. Each turnkey system may be provisioned with hardware and software elements needed to provide virtual reality demonstrations for users, suppliers, media, audiences, customers, customer prospects, or other interested parties. Each turnkey system is designed to be portable enabling the user/operator to transport the system in a vehicle and/or airplane to a remote demonstration location. Optionally, each turnkey system includes one or more pre-packaged/canned simulation experiences, conferencing software, etc., which may be used to demonstrate and/or experience the advantages and capabilities of virtual reality and/or augmented reality over convention video display technologies. Advantageously, the turnkey system may be used to improve a user/operator/content creators marketing effectiveness and sales results by enabling the user/operator/content creators to demonstrate their capabilities at a customer prospects site. Further, this example kit is designed and packaged so that a user/operator/content creator can complete a full system setup including motion tracking in 5, 10, 15, 20, 30, 45 minutes or other short duration assembly/configuration time period.

Optionally, each of the turnkey system/kits described herein includes the installation of a software application (e.g., a demonstration launcher software application) which automatically runs one or more demonstrations without any setup/configuring by a user/operator/content creator. Optionally, the launching software application or other application includes an option to manually or automatically access and/or download new simulation experiences (e.g., demonstrations) as they become available by a service provider of the turnkey system/kit and/or an authorized third-party content creator of simulations/demonstrations. Optionally, the launching software application or other application includes upgrade software which manually or automatically access and/or downloads new or revision software to keep the system up-to-date.

Optionally, each of the turnkey system/kits described herein include motion tracking technologies. In an example embodiment the turnkey system includes a camera tracking system (e.g., a four PPT-E camera tracking system from WorldViz of Santa Barbara), along with a small, lightweight, wireless motion tracker (e.g., PPT Eyes 2014 from WorldViz of Santa Barbara, which optionally mounts onto a commercially available pair of 3D glasses or head mounted display) and, a wireless handheld tracking device (e.g., Wand 2014 from WorldViz of Santa Barbara which provides accurate, smooth and robust tracking even during rigorous motions), which optionally includes a control (e.g., a joystick), which enable user/operators or other interested parties to assemble/configure an environment in a remote workspace/location (e.g., in a 6 m×6 m workspace) and let users, suppliers, media, audiences, customers, customer prospects, and other interested parties experience "presence" comparable or unlike any conventional seated Virtual Reality system.

Optionally, each of the turnkey system/kits described herein includes a head mounted display (e.g., a third party head mounted display (e.g., Oculus Rift plus a cable (e.g., an ultra-thin 7.5 m cable)) and an optional optical head mountable tracking device (e.g., PPT Eyes, which you can be attached to a third party head mounted display if desired) enabling motion tracking in a rich, immersive virtual reality environment.

Optionally, each of the turnkey system/kits described herein includes a computing device (e.g., a server, a network-cable server, laptop, or desktop computer or other computing device) optionally, pre-configured to auto configure on startup, host simulations, and handle rendering for the head mounted display as well as stream images to multiple external monitors.

A given embodiment may include some or all of the features, functionality, systems and methods described herein.

An example embodiment provides a portable virtual reality turnkey kit, comprising: a computing device; a plurality of motion tracking cameras, wherein the plurality of motion tracking cameras are configured to detect infrared light and to communicate position data derived from detected infrared light to the computing device; a handheld wireless tracking device comprising a first marker configured to emit a first repetitive pattern of infrared light pulses; a wireless tracking device configured to attach to a head mounted display, the wireless tracking device comprising at least: a second marker configured to emit a second repetitive pattern of infrared light pulses and a third marker configured to emit a third repetitive pattern of infrared light pulses, wherein the second repetitive pattern of infrared light pulses and the third repetitive pattern of infrared light pulses are distinct from each other and from the first repetitive pattern of infrared light pulses; wherein when the portable virtual reality kit, once assembled, is configured to: receive, at the computing device, from one or more of the plurality of motion tracking cameras position data corresponding to the first marker; based at least in part on the receipt by the computing device of the position data corresponding to the first marker, enable, at least in part, a scene to be rendered in the head mounted display, wherein the scene comprises a display representation of a gloved hand movement synchronized with position changes associated with the handheld wireless tracking device; receive, at the computing device, from one or more of the plurality of motion tracking cameras position data corresponding to the second marker and position data corresponding to the third marker; and based at least in part on the receipt by the computing device of the second marker position data and the receipt of the third marker position data, enable, at least in part, an orientation of the scene to be rendered in the head mounted display, wherein the orientation of the scene is synchronized with movement of the wireless tracking device in at least five degrees of freedom; and, optionally wherein the plurality of motion tracking cameras are configured to determine an identity of given marker from a distinct repetitive pattern of infrared light pulses emitted by the given marker; and, optionally further comprising: a calibration rig configured with a first plurality of calibration rig markers; wherein when the portable virtual reality kit, once assembled, is further configured to: receive, at the computing device, from one or more of the plurality of motion tracking cameras position data for each of the first plurality of calibration rig markers; and based at least in part on the received position data for each of the first plurality of calibration rig markers, generate a calibration status and provide the calibration status for display via a user interface display associated with the computing device; and, optionally wherein the portable virtual reality turnkey kit is sized to be stored in a carry-on bag no greater in size than 115 linear cm in combined length, width and height; and, optionally wherein the at least five degrees of freedom comprise X-axis, Y-axis, Z-axis, yaw, and roll; and, optionally wherein the computing device is preconfigured with one or more demonstration simulations; and, optionally wherein the computing device is configured to automatically receive application software upgrades.

An example embodiment provides a portable virtual reality turnkey kit, comprising: a computing device; a plurality of motion tracking cameras, wherein the plurality of motion tracking cameras are configured, at least in part, to capture infrared light images and to communicate image data with the computing device; a handheld wireless tracking device comprising a first marker configured to emit a first repetitive pattern of infrared light pulses; a wireless tracking device configured to attach to a head mounted display, the wireless tracking device comprising at least: a second marker configured to emit a second repetitive pattern of infrared light pulses and a third marker configured to emit a third repetitive pattern of infrared light pulses, wherein the second repetitive pattern of infrared light pulses and the third repetitive pattern of infrared light pulses are distinct from each other and from the first repetitive pattern of infrared light pulses; wherein when the portable virtual reality kit, once assembled, is configured to: receive, at the computing device, image data from one or more of the plurality of motion tracking cameras; determine from image data received at the computing device a position corresponding to the first marker, a position corresponding to the second marker, and a position corresponding to the third marker; based at least in part on the determined position corresponding to the first marker, enable a scene to be rendered in the head mounted display, wherein the scene displays a determined position change in the handheld wireless tracking device; and based at least in part on the determined position of the second marker and the determined position of the third marker, enable an orientation of the scene to be rendered in the head mounted display, wherein the orientation of the scene is synchronized with movement of the wireless tracking device in at least five degrees of freedom; and, optionally wherein the portable virtual reality turnkey kit, when assembled, is configured to: identify, from image data received at the computing device corresponding to the emitted first repetitive pattern of infrared light pulses, the first marker; identify, from image data received at the computing device corresponding to the emitted second repetitive pattern of infrared light pulses, the second marker; and identify, from image data received at the computing device corresponding to the emitted third repetitive pattern of infrared light pulses, the third marker; and, optionally further comprising: a calibration rig configured with a first plurality of markers; wherein when the portable virtual reality kit once assembled is further configured to: receive, at the computing device, from one or more of the plurality of motion tracking cameras second image data; and based at least in part on the received second image data, generate a calibration status and provide the calibration status for display via a user interface display associated with the computing device; and, optionally wherein the portable marketing kit is sized to be stored in a carry-on bag no greater in size than 115 linear cm in combined length, width and height; and, optionally wherein the at least five degrees of freedom comprise X-axis, Y-axis, Z-axis, yaw, and roll; and, optionally wherein the computing device is preconfigured with one or more demonstration simulations; and, optionally wherein the computing device is configured to automatically receive application software upgrades.

An example embodiment provides a portable virtual reality turnkey kit, comprising: a computing device; a plurality of motion tracking cameras, wherein the plurality of motion tracking cameras are configured to detect infrared light and to communicate positon data derived from detected infrared light to the computing device; a wireless tracking device configured to attach to a head mounted display; the wireless tracking device comprising at least: a second marker configured to emit a first repetitive pattern of infrared light pulses and a the third marker configured to emit a second repetitive pattern of infrared light pulses, wherein the first repetitive pattern of infrared light pulses and the second repetitive pattern of infrared light pulses are distinct from each other; wherein when the portable virtual reality kit, once assembled, is configured to: receive, at the computing device, from one or more of the plurality of motion tracking cameras position data corresponding to the first marker and position data corresponding to the second marker; and based at least in part on the receipt by the computing device of the first marker position data and the receipt of the second marker position data, enable, at least in part, an orientation of the scene to be rendered in the head mounted display, wherein the orientation of the scene is synchronized with movement of the wireless tracking device in at least five degrees of freedom; and, optionally wherein the plurality of motion tracking cameras are configured to determine an identity of a given marker from a distinct repetitive pattern of infrared light pulses emitted by the given marker; and, optionally further comprising: a calibration rig configured with a first plurality of calibration rig markers; wherein when the portable virtual reality kit, once assembled, is further configured to: receive, at the computing device, from one or more of the plurality of motion tracking cameras position data for each of the first plurality of calibration rig markers; and based at least in part on the received position data for each of the first plurality of calibration rig markers, generate a calibration status and provide the calibration status for display via a user interface display associated with the computing device; and, optionally wherein the portable virtual reality turnkey kit is sized to be stored in a carry-on bag no greater in size than 115 linear cm in combined length, width and height; and, optionally wherein the at least five degrees of freedom comprise X-axis, Y-axis, Z-axis, yaw, and roll; and, optionally wherein the computing device is preconfigured with one or more demonstration simulations; and, optionally wherein the computing device is configured to automatically receive application software upgrades High Performance Virtual Reality Kit I In an example embodiment, a portable, high-end, immersive virtual reality turn-key system enables a virtual reality environment to be assembled at a virtual reality customer prospect's location, virtual reality end-user's location, and/or other development or demonstration location. The virtual reality turn-key system optionally includes a portable computing device 110 (e.g., a portable laptop, tablet computer, smart phone, or other portable computer device), see FIG. 1. The portable computing device may include certain software, the said certain software configured to provide a development and/or execution environment and to enable the rendering of the output of the certain software on a stereophonic head mounted display 145 (e.g., Oculus Rift head mounted display, Sony Project Morpheus head mounted display, or other head mounted display) and/or a screen, see FIG. 2. Optionally, the portable computing device is pre-configured with one or more virtual reality demonstration applications enabling the user to demonstrate one or more features and/or advantages of a virtual reality system. Optionally, the portable computing device is configured to automatically check for, download, and/or install one or more virtual/augmented reality demonstration application updates, new virtual/augmented reality demonstration applications, virtual/augmented reality supporting software (e.g., PPT Studio from WorldViz LLC of Santa Barbara), and/or any other application software (e.g., third party device compatibility software, application programmatic interface software, etc.) The portable virtual reality system may also include some or all of the following: a set of tracking technologies comprising lightweight tripods 200 (e.g., 2, 3, 4, or 5 tripods) which may optionally be telescopically collapsible to size small enough to fit into carry-on luggage (e.g., no greater in size than 24 inches long, no greater in size than 23 inches long, less than 22 inches long, no greater in size than 21 inches long, no greater in size than 20 inches long, less than 19 inches long, no greater in size than 115 linear cm in combined length, width and height, or other length), Precision Position Tracking cameras 310-340 (e.g., 2, 3, 4, or 5 high performance Precision Position Tracking cameras, such as the PPT E precision motion tracking cameras from WorldViz LLC of Santa Barbara) configured to stream two dimensional centroid coordinates of detected infrared markers in the camera field of view (e.g., via onboard camera image/video processing), among other features, camera clamps 400 (e.g., 2, 3 or other number of universal camera clamps), network cables 350 (e.g., network cables for a medium sized room, such as cabling sufficient for a room with dimensions of at least about 10 m by 7 m, although longer or shorter cables may be used), and/or a power over network (e.g., Ethernet) switch 120, see FIGS. 1 and 2. To configure and calibrate the tracking cameras, an LED marker-based calibration rig (e.g., a PPT calibration rig 160 and associated white LED diffusers 220 from WorldViz LLC of Santa Barbara) is optionally included in the virtual reality product kit. The portable virtual reality system also includes display technologies comprising a stereophonic head mounted display 145 (e.g., an Oculus Rift head mounted display, Sony Project Morpheus head mounted display, or other head mounted display) and configured cable 140 enabling the wearer of the head mounted display to comfortably travel within the dimensions of the room (e.g., about a 10 m cable for a medium sized room), see FIG. 1. Optionally, the example embodiment enables a virtual reality display to be provided on a screen (e.g., via a Mini Display Port to High-Definition Multi-Media Interface adapter 390) to a larger audience, and optionally a projector and/or the screen may be included or the projector and/or the screen and/or projector may be provided by the end-user. The portable virtual reality system optionally may also include some or all of the following: interaction hardware and software technologies comprising a wireless handheld tracking device 170 (e.g., a PPT Wand from WorldViz LLC of Santa Barbara, which comprises a wireless, battery powered wand, which provides interaction and navigation in immersive virtual reality systems, and which includes a joystick/pad and trigger) enabling hand tracking and hand grabbing and/or moving of virtual objects; optionally, a head mount wireless tracking device 150 (e.g., a PPT Eyes from WorldViz LLC of Santa Barbara which is a wireless motion tracker mountable to 3D glasses or VR head mounted displays, and which provides wide-area tracking) which can be integrated with or attached to display headgear enabling the tracking of a user's head and/or body movements and virtual reality tracking software capable of detecting, via the streaming camera images, the one or more generated LED markers of the tracking devices; and tracking marker devices 370 (e.g., 1, 2, 3, 4, or more PPT Tracking marker devices from WorldViz LLC of Santa Barbara) which can be placed upon or attached to an object to track the location and motion of an object. Optionally, one or more of the tracking devices described herein can be used in a virtual reality experience, and each marker on each tracking device can be configured with a unique trackable infrared light signal. The virtual reality product kit optionally also includes certain chargers, miscellaneous cables and adapters (e.g., charging cables, adapters, and cable extensions), dongles 155, etc., see FIG. 1. Advantageously, in this example embodiment, the portable, high-end, virtual reality kit is designed to be transported on an airplane packaged in a carry-on luggage (e.g., no greater in size than 14 inches wide and 22 inches long; no greater in size than 15 inches wide and 23 inches long, no greater in size than 115 linear cm in combined length, width and height, or other carry-on luggage size and/or weight to meet airline carry-on size limits) and a backpack or purse or lightweight briefcase, wherein the carry-on suitcase holds the complete system, and the portable computing device (e.g., laptop) is optionally carried in a backpack or purse or lightweight briefcase. Optionally, the carry-on luggage may include receiving areas shaped to receive some or all of the foregoing components. For example, the carry-on luggage may include semi-rigid plastic foam or rubber with receptacle areas configured to receive some or all of the following: the tracking cameras 310-340, the hand held tracking device 170, the VR head mounted display 145, attachable head mounted optical tracking device 150, the LED marker-based calibration rig 160, the Ethernet switch 120, and/or components discussed herein, etc., see FIG. 1 and FIG. 2. The carry-on luggage may also include pouches to include certain components (e.g., the cables, etc.). The carry-on luggage may have a metal (e.g., aluminum), plastic, or fabric exterior and may optionally include wheels and a telescoping handle.

High Performance Virtual Reality Kit II

In another example embodiment, a very portable, immersive virtual reality turn-key system enabling a virtual reality environment to be setup at a virtual reality customer prospect's location, virtual reality end-user's location, or other development or demonstration location. This example embodiment is similar to the High Performance Virtual Reality Kit I system described herein above but is further weight-reduced and compacted with the elimination and/or reduction in size of certain components. In this example embodiment, the virtual reality kit includes a portable computing device 110 (e.g., a compact tablet computer, smart phone, or very light and thin laptop) wherein the portable computing device includes certain software, the said certain software configured to provide a development and/or execution environment and configured to enable the rendering of the output of the certain software on a stereophonic head mounted display 145 (e.g., such as those described elsewhere herein or otherwise) and/or a screen. Optionally, the portable computing device is pre-configured with one or more virtual reality demonstration applications enabling the user to demonstrate a one or more features and/or advantages of a virtual reality system. Optionally, the portable computing device is configured to automatically check for, download, and/or install one or more virtual/augmented reality demonstration application updates, new virtual/augmented reality demonstration applications, virtual/augmented reality supporting software (e.g., PPT Studio from WorldViz LLC of Santa Barbara), and/or any other application software (e.g., third party device compatibility software, application programmatic interface software, etc.) The portable virtual reality system also includes some or all of the following: a set of tracking technologies comprising lightweight tripods 200 (e.g., 2, 3 or other number of tripods), 1, wireless tracking cameras (e.g., 2, 3, 4, or 5 high performance Precision Position Tracking cameras, such as the PPT E precision motion tracking cameras from WorldViz LLC of Santa Barbara) configured to record image data, detect infrared light, and determine the identity and position of detected infrared markers, and stream determined two dimensional centroid coordinates of the detected infrared markers in the camera field of view (e.g., via onboard camera image/video processing), among other features. Optionally, the marker position data (e.g., tracking data) may be used (e.g., by the computing device) to render a change in a scene or orientation of a scene as viewed by a user (e.g., in a head mounted display or other visible display). Optionally, the wireless tracking cameras are powered via a light weight battery source. Optionally, 2 (or other number) universal camera clamps 400 may be configured to enable an end-user to quickly mount the tracking cameras (e.g., 2 on each tripod, one on or towards the top and one at a lower elevation (e.g., about 30 cm lower)). In this example embodiment, the tracking software accounts for the reduced tripod 200 configuration as further described herein below. However, there are certain physical limitations in tracking the LED markers associated with tracking devices in a reduced tripod configuration, and therefore, the system performance may be suboptimal and may not be appropriate for all customer presentation/demonstrations. To configure and calibrate the tracking cameras an LED marker-based calibration rig 160 and associated white LED diffusers 220 (e.g., a PPT calibration rig from WorldViz LLC of Santa Barbara) is optionally included in the virtual reality product kit. The portable virtual reality system also includes display technologies comprising a stereophonic head mounted display 145 (e.g., such as those described elsewhere herein) and configured cable 140 enabling the wearer of the head mounted display to comfortably travel within the dimensions of a room (e.g., about 10 m cable for a medium size room), see FIG. 1. Optionally, the stereophonic head mounted display is wireless and battery powered, and therefore, without cables. Optionally, the example embodiment enables a virtual reality display on a screen (e.g., via a Mini Display Port to High-Definition Multi-Media Interface adapter 390) to a larger audience but a projector and the screen are not included in this example embodiment. The portable virtual reality system also includes interaction hardware and software technologies comprising a handheld wireless tracking device 170 (e.g., a PPT Wand from WorldViz LLC of Santa Barbara) enabling hand tracking and hand grabbing and/or moving of objects. Optionally, a head mount wireless tracking device 150 (e.g., a PPT Eyes from WorldViz LLC of Santa Barbara) which can be integrated with or attached to display headgear enabling the tracking of a user's head and/or body movements and virtual reality tracking software capable of detecting, via the streaming camera images, the one or more generated LED markers of the tracking devices; and tracking marker devices 370 (e.g., two PPTtracking marker devices from WorldViz LLC of Santa Barbara) which can be placed upon or attached to an object to track the location and motion of an object Optionally, one or all of the tracking devices described herein can be used in a virtual reality experience as each marker on each tracking device can be configured with a unique trackable infrared light signal. The virtual reality product kit also optionally includes certain chargers, miscellaneous cables and adapters (including charging cables, adapters, and cable extensions), dongles 150, etc. Advantageously, in this example embodiment, the portable, high-end, virtual reality kit is designed to be transported on an airplane packaged in a carry-on luggage and optionally a backpack or purse or lightweight briefcase, wherein the light weight carry on optionally holds the complete system and the portable computing device (e.g., tablet computer) is carried in a backpack or purse. Optionally, the carry-on luggage may include receiving areas shaped to closely receive some or all of the foregoing components. For example, the carry-on luggage may include semi-rigid plastic foam or rubber with receptacle areas configured to receive some or all of the following: the tracking cameras 310-340, the hand held tracking device 170, the VR head mounted display, the VR head mounted display 145, attached head mounted display tracking device 150, the LED marker-based calibration rig 160, the Ethernet switch 120, and/or components discussed herein, etc. The carry-on luggage may also include pouches to include certain components (e.g., the cables, etc.).

High Performance Virtual Reality Box I (VizBox I)

In another example embodiment, a portable, immersive Virtual Reality turn-key system labeled as VizBox I enables a virtual reality environment at a virtual reality customer prospect's location, virtual reality end-user's location, or other development or demonstration location. This example embodiment is conceptually similar to the turn-key kits previously described but provides more compact packaging, fewer components, is faster to assemble, and is even simpler for an end-user to configure and use. Advantageously, optionally the VizBox I, is configured such that an end-user can initiate a VR session by simply opening the VizBox I case, removing a headset and controller(s), connecting a power cord from within the case to an external power source, and optionally accessing an enclosed computing device keyboard.

Case

Figure 6:
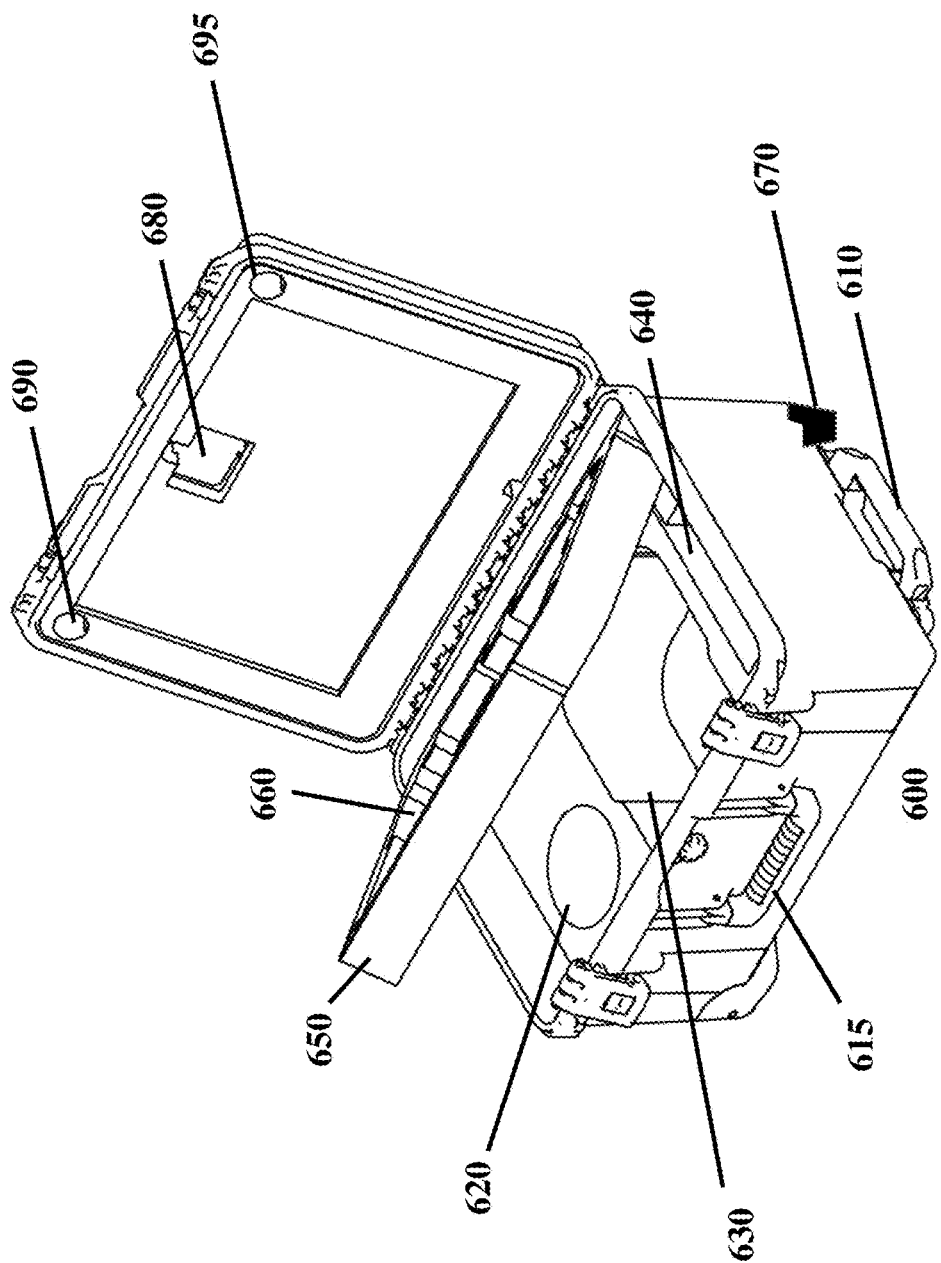
FIG. 6 illustrates an example customized case for housing a turn-key and portable virtual reality system.

In this example embodiment, the VizBox I system and associated components are packaged in a portable, sturdy, light-weight case 600 as illustrated in FIG. 6. The VizBox I case may optionally be comprised of solid-wall construction enabling the case to be both durable and lightweight. The case may have a metal (e.g., aluminum), plastic, and/or fabric exterior. Optionally, the VizBox I case include two or more wheels and/or a retractable handle 610 (wherein the wheels are positioned at the bottom of the case opposite the handle). The wheels and retractable handle enable an end-user to roll the VizBox I system from one location to another location with a reduction in effort. Optionally, the VizBox I case includes a handle 615 for those occasions in which the case needs to be lifted. Optionally, the VizBox I case includes case latching features which enable easy access while preventing inadvertent opening (e.g., a double-throw latch system). Optionally, the VizBox I case is water-tight. Optionally, the VizBox I case is reinforced with metal and configured to accommodate locks (e.g., a padlock) to prevent unwanted access. Optionally, the VizBox I case is lined with semi-rigid foam or rubber. Optionally, the foam lining and/or foam inserts provide protection from impacts and vibrations associated with travel. The semi-rigid foam is optionally configured (e.g., with the use of cutouts and inserts) to act as a receiving area for VizBox I system hardware components, manage the cabling between hardware components (clutter reduction and access), and/or manage computing device airflow. Optionally, VizBox I components which are to be removed by an end-user for use include, a headset, one or more hand controllers, and/or a power cord. In this example, these removable hardware components are stored in the bottom portion of the case in cutouts 620, 630, and 640, respectively. Optionally, removable hardware components are accessed by lifting an attached (e.g., attached on one end) shelf 650 upward via a handle (e.g., a strap handle, not shown in FIG. 6). Optionally, a computing device 110 with a monitor is configured to be housed in a case shelf cutout 660, see FIG. 6. Optionally, the case shelf 650 is configured with a one or more cutout vents to exhaust heat generated by the system's computing device when the shelf is closed. In an example embodiment, the VizBox I case is further configured with an optional one or more external stabilizing legs 670 to eliminate case rock-back when the case shelf containing the computing device 110 is lifted upwards to remove or return removable hardware components in the storage area. Optionally, the inside of the case lid is configured with a cut-out 680 in which an end-user's wireless mobile device (e.g., smartphone, iPhone, etc.) may be inserted during a VR session. Optionally, the mobile device cutout 680 is positioned high enough on the lid to enable a monitor associated with the computing device to not fully obstruct mobile device access (e.g., a portion above the height of the laptop screen when open). Optionally, the user's wireless mobile device may be configured to provide data network access for the system (e.g., via a personal hot spot).

Computing Element

Figure 2:
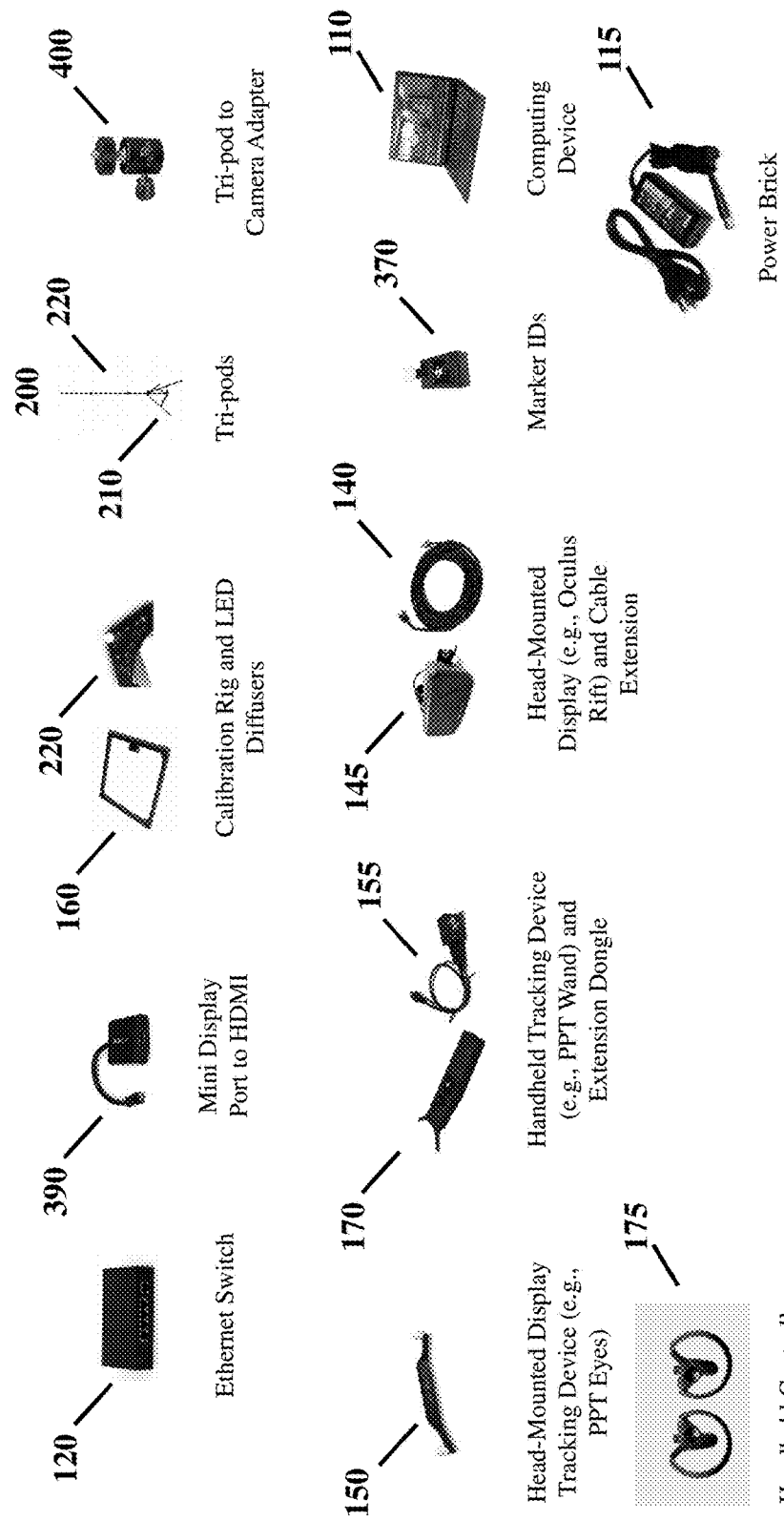
FIG. 2 illustrates certain example hardware elements of a portable virtual reality hardware configuration.

A VizBox I embodiment optionally includes a computing device 110 with a detached or integrated monitor, and keyboard (e.g., a graphics computing device, a portable laptop, tablet computer, smart phone, or other portable computer device), see FIG. 2. Optionally, the computing device 110 is placed into a foam cutout 610 in the case shelf 650 such that the top of the computing device is uniformly level with the foam. The computing device may include certain software (e.g., configured to provide a development and/or execution environment and to enable the rendering of the output of the certain software on a stereophonic head mounted display 145 (e.g., Oculus Rift head mounted display, Sony Project Morpheus head mounted display, or other head mounted display), see FIG. 2). Optionally, the portable computing device is pre-configured with one or more virtual reality conferencing and/or demonstration applications enabling the user to experience one or more features and/or advantages of a virtual reality system. Optionally, the portable computing device once connected to a network (e.g., a Wi-Fi network, Local Area network, and/or other data network) is configured to automatically check for, download, and/or install one or more virtual/augmented reality demonstration application updates, new virtual/augmented reality demonstration applications, virtual/augmented reality supporting software (e.g., PPT Studio from WorldViz LLC of Santa Barbara), and/or any other application software (e.g., third party device compatibility software, application programmatic interface software, etc.).

Tracking Technologies

A VizBox I embodiment optionally includes two or more tracking devices 690, 695 (e.g., a plurality of Oculus Rift camera/sensors or Precision Position Tracking cameras, such as the PPT E precision motion tracking cameras from WorldViz LLC of Santa Barbara 310-340, see FIG. 2, or 2, 3, 4, or 5, see FIG. 2) affixed to the inside lid of the case 600 as illustrated in FIG. 6. The configured tracking devices 690, 695 stream position data of detected infrared markers in the camera/sensor 690, 695 field of view (e.g., via onboard camera image/video processing). The camera/sensors 690, 695 are preferably positioned at a sufficient distance apart to ensure adequate detection and image processing in a Virtual Reality session. The tracking cameras/sensors 690, 695 are configured to interwork with the included hand-held controllers and head mounted display. Tracking device calibration may be performed during kit assembly. Thus, optionally, no end-user cameras/sensors 690, 695 positioning or calibrating of the cameras/sensors 690, 695 is required on behalf of the end-user.

Cabling

Optionally, one or more network cables (e.g., HDMI and/or USB network cables) are included within a VizBox I. Optionally, said cables are placed and/or threaded through the case interior foam and/or cutouts and connected to their respective devices and tested prior to shipment of the VizBox I to a customer. Advantageously, pre-configured and tested cabling eliminates or reduces end-user configuration steps, testing, and configuration errors.

Display and Tracking Technologies

Figure 7:
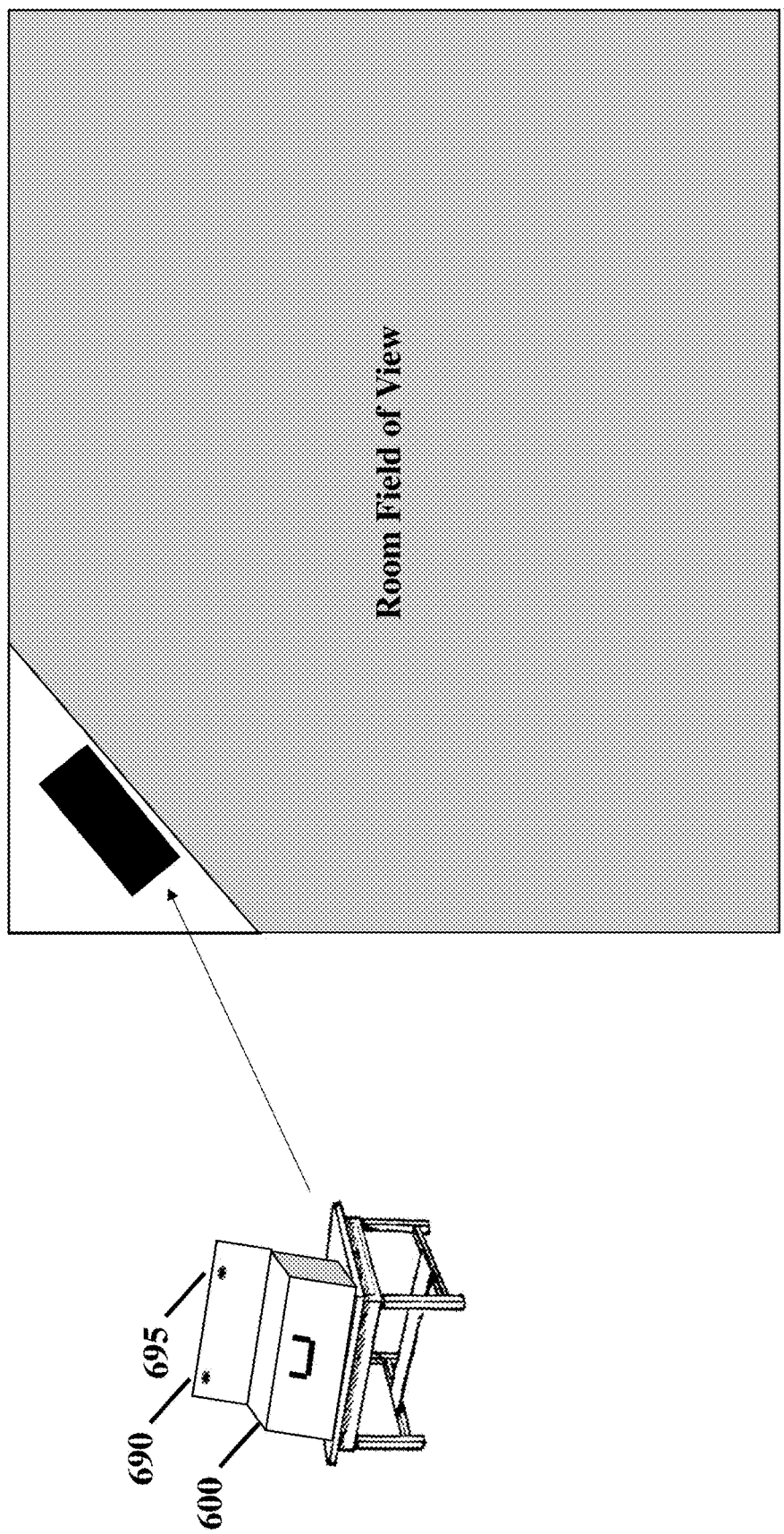
FIG. 7 illustrates an example room camera/sensor coverage with an example all-in-one virtual reality system embodiment.

The portable virtual reality system also includes display technologies comprising a head mounted display 145 (e.g., e.g., a stereophonic head mounted display such as an Oculus Rift head mounted display, Sony Project Morpheus head mounted display, or other head mounted display) and configured cable 140 enabling the wearer of the head mounted display to comfortably travel within the dimensions of a room as illustrated in FIG. 7 (darker shade area illustrating cameras/sensors field of view). Optionally, a portion of the case shelf includes a cutout for positioning of the head mounted display cable 140 when the upper shelf is closed or in a down position. Optionally, the headset 145 is connected to the computing device 110 prior to shipment to the end-user. The portable virtual reality system optionally may also include some or all of the following interactive hardware and software technologies including but not limited to: a wireless handheld tracking device (e.g., Oculus Touch hand-held controller(s) 175 or a PPT Wand 170 from WorldViz LLC of Santa Barbara, which comprises a wireless, battery powered wand, which provides interaction and navigation in immersive virtual reality systems, and which includes a joystick/pad and trigger enabling hand tracking and hand grabbing and/or moving of virtual objects); a head mount wireless tracking device 150 (e.g., a PPT Eyes from WorldViz LLC of Santa Barbara which is a wireless motion tracker mountable to 3D glasses or VR head mounted displays); and optionally tracking marker devices 370 (e.g., 1, 2, 3, 4, or more PPT Tracking marker devices from WorldViz LLC of Santa Barbara) which can be placed upon or attached to an object to track the location and motion of an object. Optionally, one or more of the tracking devices described herein can be used in a virtual reality experience, and each marker on each tracking device can be configured with a unique trackable infrared light signal.

Power

The example VizBox I optionally includes a power brick 115 and associated power cord for external power access. Optionally, a separate cutout in the storage area of the case 640 is provided for the power brick and cord. Optionally, a portion of the upper shelf includes a cutout for an end-user to position the power cord when the shelf is closed or in a down position. Optionally, the VizBox I case is configured with an external power interface. Advantageously, with an external power interface, an end-user simply plugs in an included extension cord (or end-user provided) to an available AC power outlet. Optionally, the VizBox I assembly includes an embedded and/or external portable power supply (e.g., a set of lithium ion batteries), which optionally provides uncompromised cordless operation (e.g., for example, a 4, 6, or 8 hours runtime) and/or in operational scenarios in which it may be inconvenient or difficult to access local power. Provided the embedded/included battery is charged, the end-user may skip the power connection configuration step described below, further reducing the end-user steps to initiating a Virtual Reality session.

High Performance Virtual Reality Box II (Referred to Herein as VizBox I)

Certain tracking technologies described herein optionally utilize outside-in technologies. Outside-in tracking generally relates to the placement of camera(s)/sensor(s) in a room and the system determines the position of the tracked device in relation to its environment. Optionally, inside-out tracking may be utilized. In this environment, a one or more cameras/sensors are placed on a user wearable device being tracked (e.g., head mounted display) and the cameras/sensors look outward to determine position changes in relation to the external environment. Advantageously, inside-out tracking may be done with or without markers and without a wired connection enabling greater end-user mobility. In an example embodiment, VizBox II is based on outside-in tracking.

Optionally, VizBox II includes the system components previously described above for VizBox I. However, in VizBox II, the tracking camera(s)/sensor(s) are integrated into the head mounted display. Therefore, the camera(s)/sensor(s) 690, 695 affixed to the case are not included (nor is the associated camera(s)/sensor(s) cabling).

In a VizBox II configuration, the head mounted display exchanges data with the computing device via a wireless connection (e.g., Wi-Fi).

Economical, Lower Cost High Performance Virtual Reality Kit

In another example embodiment, a portable, immersive Virtual Reality turn-key system enables a virtual reality environment at a virtual reality customer prospect's location, virtual reality end-user's location, or other development or demonstration location. This example embodiment is similar to the High Performance Virtual Reality Kit I and II described herein but more economical, using relatively lower cost and performance cameras (e.g., 4 PPTX cameras from WorldViz LLC of Santa Barbara) replace the high performance tracking cameras, thereby reducing the virtual reality kit cost while only slightly reducing the overall system performance. Optionally, the lower cost and performance motion capture cameras record image data including emitted infrared light in a tracking area. Optionally, the recorded image data is provided (e.g., streamed) to the computing device provided in the virtual reality product kit over the data network (included in the virtual reality product kit) interconnecting the motion capture cameras and the computing device or other computing device. Optionally, the computing device receiving the provided image data is configured with software (e.g., PPT Studio software from WorldViz LLC of Santa Barbara) capable of determining from the image data, a position and identity for each infrared markers in the field of view/tracking area of the motion capture cameras. Optionally, the calculated/determined/derived position and identity information (e.g., tracking data) may be used (e.g., by the computing device) to render a change in a scene or orientation of a scene as viewed by a user (e.g., in a head mounted display or other visible display).

The hardware and software components which comprise a virtual reality product kit, development kit, and/or demonstration kit described herein may have fewer or additional components and may be packaged in a variety of manners and styles and are not limited by the illustrative example embodiments described herein. The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The user terminals described herein may be in the form of a mobile communication device (e.g., a cell phone), laptop, tablet computer, interactive television, game console, media streaming device, head-wearable display, networked watch, etc. The terminals may optionally include displays, user input devices (e.g., touchscreen, keyboard, mouse, voice recognition, etc.), network interfaces, etc.

Many variations and modifications may be made to the above described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. As is also stated above, the use of particular terminology when describing certain features or aspects of certain embodiments should not be taken to imply that the terminology is being re-defined herein to be restricted to including any specific characteristics of the features or aspects of the invention with which that terminology is associated.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. While various example dimensions, measurements and weights may be described, other dimensions, measurements and weights may be used.

While the detailed description herein has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

As previously described herein, the portable virtual reality system optionally may include Precision Position Tracking cameras (e.g., 1, 2, 3, 4, . . . up to 32 high performance Precision Position Tracking cameras, such as the PPT E precision motion tracking cameras from WorldViz LLC of Santa Barbara) provide streaming two dimensional centroid coordinates of detected infrared markers in the camera field of view (e.g., via onboard camera image/video processing), among other features. Other features of the PPT E cameras may include some or all of the following: color or black and white complementary metal-oxide-semiconductor (CMOS) camera sensors; three degrees-of-freedom positioning; six degrees-of-freedom (X, Y, Z, yaw, pitch, roll) positioning with an optional sensor; approximately 5, 10, or 20 meter camera range or other working camera range, and a recommended tracking space of approximately 20 meters by 20 meters by 10 meters or other tracking space (where, for a marker to be tracked, preferably, the marker is visible to two or more cameras.) Overall tracking space dimensions may be determined by the camera range, camera layout, and/or background lighting). Other optional features may include 1 to 32 independent three degrees-of-freedom tracking targets (although optionally more than thirty-two targets are utilized); tracking precision of approximately less than one-quarter of a millimeter over a 3 meter by 3 meter by 3 meter volume; optical sensor precision is 1:20,000 arc at 75 degrees rms; tracking accuracy may be approximately less than a quarter of a centimeter over a 3 meter by 3 meter by 3 meter volume; a field of view for a given camera of 79 degrees horizontal (standard) and about 98 degrees horizontal (wide) for each camera (and not, for example, the resulting trackable space of the system of cameras), (although smaller or wider fields of views may be provided); calibration may be performed in less than 1 minute (e.g., 30 seconds or less) using a digital calibration rig; the update rate may be about 180 Hz (although a higher or lower update frequency may be used); the maximum cable length to the cameras may be approximately 200 meters (although shorter or longer cable lengths may be used); an analog camera interface may be included; a minimum latency of approximately 20 milliseconds may be provided (although shorter or longer latencies may be provided); interface options may include Ethernet, using VRPN (Virtual-Reality Peripheral Network); compatibility with certain ambient conditions (e.g., indoor fluorescent lighting); the camera size may be about 45 by 32 by 92 millimeters and may weigh about 145 grams (although cameras with different dimensions and weights may be used); the cameras may be configured to directly connect to software (e.g., Vizard VR toolkit from WorldViz LLC of Santa Barbara; dll for Windows; C source library for Linux). It is understood that dimensions, ranges, and components other than those recited above, may be used, such as those discussed with respect to other embodiments.

As previously described herein, the portable virtual reality system optionally may include Precision Position Tracking cameras (e.g., 1, 2, 3, 4, . . . up to 8, Precision Position Tracking cameras, such as the PPT X precision motion tracking cameras from WorldViz LLC of Santa Barbara) configured to stream live video to a computing device (including a portable computing device) hosting virtual reality tracking software capable of processing live video in substantially real-time on the computing device. Optionally, the received live video stream is converted on the computing device (e.g., the portable computing device 110 of the portable virtual reality system) to a collection of images via analog to digital conversion process. Optionally, additional image processing and calculations are performed on the digital output by the system in order to generate two-dimensional centroid coordinates of detected infrared markers. Other features of the PPT X cameras may include one or more of the following: charge-couple device camera sensors; three degrees-of-freedom positioning; six degrees-of-freedom (X, Y, Z, yaw, pitch, roll) positioning with an optional sensor; approximately 5 meter, 15 meter, and 30 meter camera range and a recommended tracking space of approximately 10 meters by 10 meters by 10 meters or other tracking space (where for a marker to be tracked, the marker is visible by two or more cameras). Overall tracking space dimensions may be determined by the camera range, camera layout, and/or background lighting. Other optional features may include multiple (e.g., 2, 4, 6, 8, 9, 10, 11) independent three degrees-of-freedom tracking targets; tracking precision of approximately less than 0.5, 1, 2, or 5 millimeters over a 3 meter by 3 meter by 3 meter volume; optical sensor precision may be about 1:10,000, 1:20,000, 1:30,000 arc at 75 degrees rms; tracking accuracy of approximately less than 0.1, 05, or 1 centimeter over a 3 meter by 3 meter by 3 meter volume; a field of view of 60, 68, 75, or 80 degrees horizontal (standard) and 80, 88, 95 degrees horizontal (wide) (although smaller or wider fields of views may be provided) for each camera (and not, for example, the resulting tracking space of the system of cameras); less than 30 seconds, one minute, or two minutes using a digital calibration rig; 30 Hz, 60 Hz, or 120 Hz update rate (although a higher or lower update frequency may be used); a centralized or distributed computing device for image processing; a maximum cable length to cameras of approximately 15 meters, 30 meters, 50 meters, or 75 meters; an analog camera interface may be included; a minimum latency of 10, 18, or 30 milliseconds may be provided (although shorter or longer latencies may be provided); interface options (e.g., RS-232, USB, Bluetooth, WiFi, etc.), 115.2 kilobits per second, streamed or polled and Ethernet; compatibility with certain ambient conditions (e.g., indoor fluorescent lighting); camera size of 160 by 70 by 60 millimeters and weighting 500 grams (although cameras with different dimensions and weights may be used); and, the cameras may be configured to directly connect to software (e.g., Vizard VR toolkit from WorldViz LLC of Santa Barbara; dll for Windows; C source library for Linux). It is understood that dimensions, ranges, and components, other than those recited above, may be used.

As previously described herein, the portable virtual reality system optionally may include a handheld wireless tracking device (e.g., a PPT Wand from WorldViz LLC of Santa Barbara, which comprises a wireless, battery powered wand, which provides interaction and navigation in immersive virtual reality systems, and which includes a joystick/pad and trigger) enabling hand tracking and hand grabbing and/or moving of virtual objects. Other optional features of a handheld wireless tracking device may include some or all of the following: a rechargeable (e.g., lithium ion) battery endurance of 8 hours with a range of more than 20 meters without impacting performance; an ergonomic one-handed design, vibrant button touch, and a multitude of input modes; automatic "go-to-sleep" mode if not moved for one minute, and turn off after 10 minutes to save on battery power; user switchable between USB charge mode and USB power mode; easily reprogrammable wand settings (sleep mode and turn-off timer periods, LED Identifiers, LED light intensity) via a software application (or via software toolkit from WorldViz LLC of Santa Barbara) wherein the wand is connected to a user's computer (e.g., wirelessly, via a micro USB port, or via other interface; compatible with a plurality of protocols (e.g., optionally including one or more of: TrackD, VRPN, or WorldViz native PPT protocol); six degrees-of-freedom (X, Y, Z, yaw, pitch, roll); angular range may be a full 360 degrees—all axis; tracking precision may be approximately less than a quarter of a millimeter over a 3 meter by 3 meter by 3 meter volume with a rotation precision of 0.03 degrees; position accuracy may be approximately less than a quarter of a millimeter over a 3 meter by 3 meter by 3 meter volume with a rotation accuracy of one degree RMS yaw, one quarter of a degree RMS in pitch and roll; update rate may be about 180 Hz with PPT E series; latency may be 20 milliseconds with PPTE series; light weight (e.g., about 196 grams); wand size may be about 239 by 65 by 110 millimeters; passive and active LED mode (PPT Marker IDs). It is understood that dimensions, ranges, and components, other than those recited above, may be used, such as those discussed with respect to other embodiments.

As previously described herein, the portable virtual reality system optionally may include a head mountable wireless tracking device (e.g., a PPT Eyes from WorldViz LLC of Santa Barbara which is a wireless motion tracker mountable to 3D glasses or VR head mounted displays, and which provides wide-area tracking) which can be integrated with or attached to display headgear enabling the tracking of a user's head and/or body movements and virtual reality tracking software capable of detecting, via the streaming camera images, the one or more generated LED markers of the tracking devices. Other features of a head mountable wireless tracking device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (with low intensity setting) with a range of more than 20 meters (with high intensity setting) without impacting performance; optionally factory or self-mounted onto commercially available passive and active 3D glasses; automatic "go-to-sleep" mode (e.g., triggered if not moved for a threshold first period of time (e.g., 30 seconds)), and turn off after a threshold second period of time (e.g., 10 minutes) to save on battery power; user switchable between USB charge mode and USB power mode; easily reprogrammable device settings (e.g., sleep mode and turn-off timer periods, LED Identifiers, LED light intensity) via a software application (or via software toolkit from WorldViz LLC of Santa Barbara) wherein the device is connected to a user's computer via a wired or wireless interface (e.g., a micro USB port); compatible with a plurality of protocols (e.g., including one or more of the following TrackD, VRPN, WorldViz PPT Studio, etc.)); six degrees-of-freedom (X, Y, Z, yaw, roll enabling the full determination of left/right eye locations needed for stereoscopic viewing; angular range may be 360 degrees—all axis; tracking precision may be approximately less than a quarter of a millimeter over a 3 meter by 3 meter by 3 meter volume with a rotation precision of 0.09 degrees; position accuracy may be approximately less than a quarter of a millimeter over a 3 meter by 3 meter by 3 meter volume with a rotation accuracy of one degree RMS yaw, one quarter of a degree RMS roll; update rate of 180 Hz; latency of no more than 20 milliseconds; light weight (e.g., 30 grams with two infrared red diffusion balls); device size may be 203 by 14 by 32 millimeters; active LED mode (PPT Marker IDs). It is understood that dimensions, ranges, and components, other than those recited above, may be used, such as those discussed with respect to other embodiments.

As previously described herein, the portable virtual reality system optionally may include wireless tracking marker devices which can be placed upon or attached to an object to track the location and motion of an object. Other optional features of a wireless tracking marker device may include: USB recharging; programmable via a Microsoft Windows, OS X, IOS, Android, Unix, Linux and/or other configuration application; lack-of-motion detection causes automatic shut-off for battery savings; momentary switch for on/off, mode and programming; marker device screw mount and strap mounts; small size (e.g., about 203 mm×14 mm×32 mm); light weight (e.g., about 30 g).

As previously described herein, the portable virtual reality system optionally may include an LED marker-based calibration rig (e.g., a PPT calibration rig from WorldViz LLC of Santa Barbara). Other features of a calibration rig may include: a small four-point calibration board used to define the entire tracking volume and XYZ coordinate system. The tracking sensors may be about 45 mm×32 mm×92 mm and may weigh about 145 g, although other dimensions and weights may be used.

Figure 3:
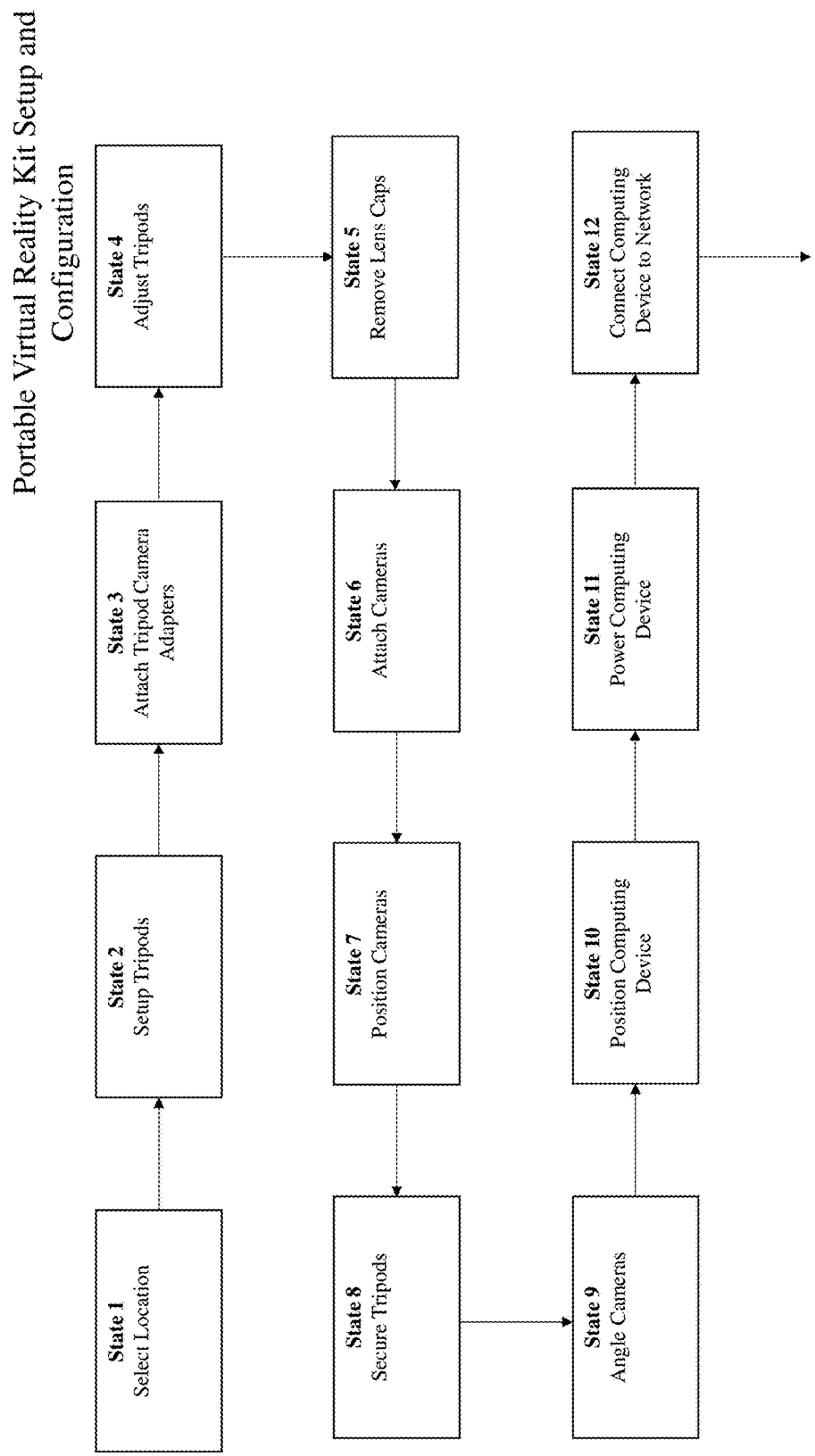
FIG. 3 illustrates a process of configuring a portable virtual reality configuration.
Figure 4:
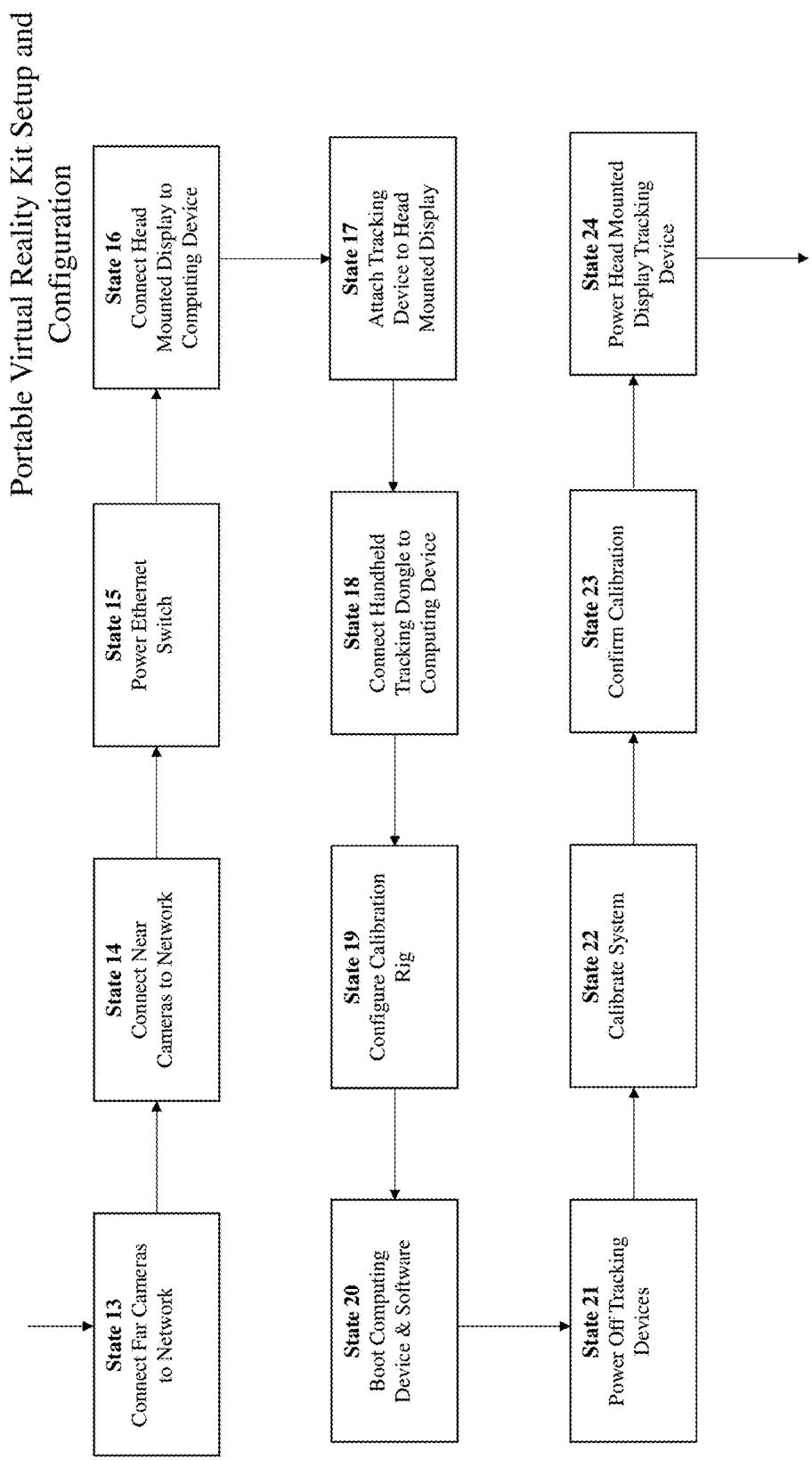
FIG. 4 illustrates a continued process of configuring a portable virtual reality hardware configuration.
Figure 5:
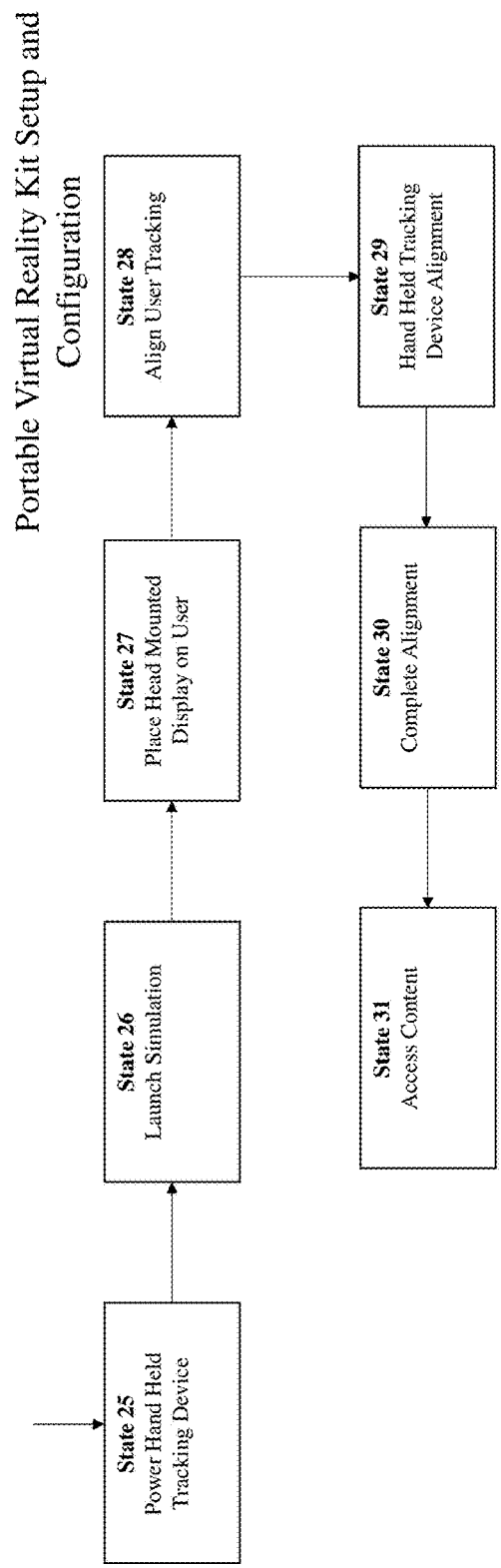
FIG. 5 illustrates a continued process of configuring a portable virtual reality hardware configuration.

FIG. 3 illustrates an example process for setting up and/or configuring a portable virtual reality system described herein. It is understood that the various steps may be performed in a different order, and fewer or additional steps may be performed. It is also understood that the components discussed below and in a portable kit are example components, and fewer, additional, or different components may be utilized. In addition, the dimensions and parameters discussed below are example dimensions and parameters, and other suitable dimensions and parameters may be used.

State 1. The user selects a location which is dimly lit with fluorescent, xenon, or Light Emitting Diode (LED) lighting. Optionally, the user blocks out direct sunlight that may enter the selected location. The tracking of infrared LED markers are enhanced when working in a dimly lit environment. Within the selected location the user defines a tracking area 100 measuring approximately 6 meters by 6 meters or smaller as illustrated in FIG. 1.

State 2. The user, for each tri-pod 200 included in the kit (e.g., backpack), attaches one tri-pod extension 220 to the top of each tri-pod base 210 wherein the tri-pod extension 220 (see also FIG. 2) enables the cameras 310-340 to be elevated above the selected tracking area 100.

State 3. The user attaches one tri-pod-to-camera connector 400 included in the kit to the top of each tri-pod extension 220.

State 4. The user sets the base legs 210 on each tri-pod 200 to less than full extension (e.g., approximately 50 percent of full extension or other suitable amount) and then fully extends each vertical section 220 (e.g., 3 sections) of the tri-pod 200 (e.g., to the full extension of each vertical section of the tri-pod extension 220).

State 5. The user removes the lens cap from each camera 310-340 included in the kit.

State 6. The user attaches each camera 310-340 to the top of each tri-pod-to-camera connector 400.

State 7. As illustrated in FIG. 1, the user places each tri-pod 200 and attached camera 310-340 in respective corners of the tracking area 100 (e.g., in each corner of a square/rectangular area). Each camera 310-340 is positioned with the camera lens facing approximately the center of the tracking area 100.

State 8. The user optionally secures (e.g., using tape) each tri-pod base legs 210 to the boundary of the tracking area 100.

State 9. The user angles each camera 310-340 slightly downwards pointing to the opposing tri-pod base 210. For example, camera 320 is oriented downwards to the tri-pod base associated with camera 340 (see also example camera positioning in FIG. 1).

State 10. The user places the laptop computing device 110 (or other computing device, for example, a tablet, smart phone, server, desktop computer, etc.) included in the kit hosting the simulation application in an area adjacent to the tracking area 100 as illustrated in FIG. 1. Optionally, a power over Ethernet (PoE) switch 120 included in the kit is similarly located adjacent to the tracking area 100 as illustrated in FIG. 1.

State 11. The user plugs the laptop 110 (or other hosting computing device) into a power source (e.g., wall power).

State 12. The user connects the short length Ethernet cable 130 (e.g., 10 foot cable or other desired length) included in the kit to the laptop 110 at one end and to the Ethernet switch 120 at the other end as illustrated in FIG. 1.

State 13. The user connects the two longest length Ethernet cables 130 (e.g., 50 foot cables or other desired length) included in the kit to the two tracking cameras 320, 330 furthest from the laptop 110 and routes the cables outside the boundary of the tracking area as illustrated in FIG. 1. The user also connects the Ethernet cables 130 into the Ethernet Switch 120. This state enables data communication connectivity between the two tracking cameras 320, 330 and the laptop 110.

State 14. The user connects the two medium length Ethernet cables 135 (e.g., 25 foot cables or other desired length) included in the kit to the two tracking cameras 310, 340 nearest to the laptop 110 and routes the cables outside the boundary of the tracking area as illustrated in FIG. 1. The user also connects the Ethernet cables 135 into the Ethernet Switch 120. This state enables data communication connectivity between the two cameras 310, 340 and the laptop 110.

State 15. The user connects the Ethernet switch 120 to a power adapter included in the kit and plugs the Ethernet switch 120 into a power source (e.g., wall power) as illustrated in FIG. 1.

State 16. The user connects the head mounted display extension cable 140 (e.g., a 30 foot cable or other desired length) to the head mounted display 145 (e.g., Oculus Rift head mounted display included in the kit) at one end and into the laptop 110 at the other end as illustrated in FIG. 1.

State 17. The user attaches a marker tracking device 150 (e.g., a Precision Positioning Tracking Eyes from WorldViz as previously described herein) include in the kit to the top of the head mounted display 145 with the two white globes pointing forward (e.g., in the case in which a PPT Eyes tracking device is used). Optionally, to conserve battery power, the user may turn the tracking device 150 power off. The tracking device 150 enables the system to track the movement of the user wearing the head mounted display 145 during a demonstration/simulation.

State 18. The user connects the handheld tracking device dongle 155 included in the kit to the laptop 110 using a USB extension included in the kit as illustrated in FIG. 1.

State 19. The user prepares to calibrate the Precision Position Tracking (PPT) system by placing the calibration rig included in the kit on the floor in approximately the middle of the tracking area (e.g., with "+Z" directed towards the laptop 110) as illustrated in FIG. 1. If the calibration rig is covered, the user removes the covers (e.g., neoprene covers) from each corner of the calibration rig and slips a diffuser 220 (e.g. a white LED diffuser) over each LED calibration light (e.g., in each corner) on the calibration rig. The user powers on the calibration rig.

State 20. The user powers on the laptop 110 by selecting the laptop power control (e.g., a power button in the upper right hand corner of the keyboard). In this example, VR/AR software (e.g. PPT Studio software from WorldViz LLC of Santa Barbara) is installed on the laptop 110 and is configured to start automatically in response to a power on selection. The user waits until the laptop has finished a boot sequence and the VR/AR software starts.

State 21. Optionally, the user confirms that all tracking devices, including but not limited to, the wireless handheld tracking device 170 and position tracking device 150 attached to the head mounted display 145 are in their off position (e.g., to prevent interference during the system calibration).

State 22. The user calibrates the system by selecting a calibrate control displayed in the PPT Studio user interface (e.g., a user interface button control labeled "Calibrate"). In response to the user selection, the PPT Studio software initiates a calibration sequence with each of the cameras 310-340.

State 23. The PPT Studio completes its calibration process, the user interface displays a percentage level of calibration and confirms each camera 310-340 is connected and operational (e.g., by displaying in a PPT Studio user interface a green indicator for each camera 310-340). The user confirms the system is calibrated by confirming in the VR/AR software (e.g., PPT Studio) user interface display that the percentage level of calibration exceeds an acceptable threshold percentage (e.g., 95 percent) and that the cameras are operation and connected. If the calibration process fails, the user optionally checks for (1) sunlight in the tracking area, (2) bright non-xenon, non-fluorescent, non-LED lights in the tracking area, (3) camera 310-340, Ethernet switch 120, and laptop 110 connections are secure, and/or (4) all marker tracking devices 150,170 are powered off.

State 24. The user powers on the marker tracking device 150 associated with the head mounted display 145.

State 25. The user powers on the wireless hand held tracking device 170 (e.g., a PPT Wand from WorldViz as previously described herein).

State 26. The user, on the laptop 110 minimizes the VR/AR software window (e.g. PPT Studio) and navigates to the desktop. The user starts a software launching program (e.g., Viz.Go Launcher from WorldViz LLC of Santa Barbara) via a desktop shortcut (for example by double clicking the Viz.Go Launcher shortcut). The software launching program initiates the simulation and is also used to establish alignment described in the following steps.

State 27. The user places the included head mounted display 145 onto his/her head. A virtual "holodeck" as well as a floating hand is displayed in the head mounted display 145.

State 28. The user faces towards the laptop 110 within the tracking area 100 and stands still for a short period of time (e.g., 5, 10, 15 seconds) enabling the system to align the user's location within the tracking area 100 via the light emitting infrared tracking markers 150 attached to the head mounted display 145.

State 29. The user resets the displayed hand by pointing the wireless hand held tracking device 170 towards the laptop 110 and selects a one or more controls at substantially the same time (e.g., a trigger control and analog joystick control in a PPT Wand from WorldViz LLC of Santa Barbara).

State 30. The laptop 110 wirelessly receives control activation (e.g., a trigger and joystick selection) via the dongle 155. In response to the received handheld tracking device control selections, the system aligns the orientation of the hand.

State 31. The virtual reality simulation/demonstration content menu is presented in a user interface display of the head mounted display 145 when the user is facing towards the laptop. The user optionally uses a control on the hand held tracking device 170 (e.g., a middle button on the tracking wand of a PPT Wand from WorldViz) to toggle the displayed menu. The user optionally activates a control on the handheld tracking device 170 (e.g., a trigger button on the tracking wand 170 in the case of a PPT Wand from WorldViz) to select or grab displayed menu items including demonstration icons to initiate a VR/AR simulation/demonstration.

Figure 8:
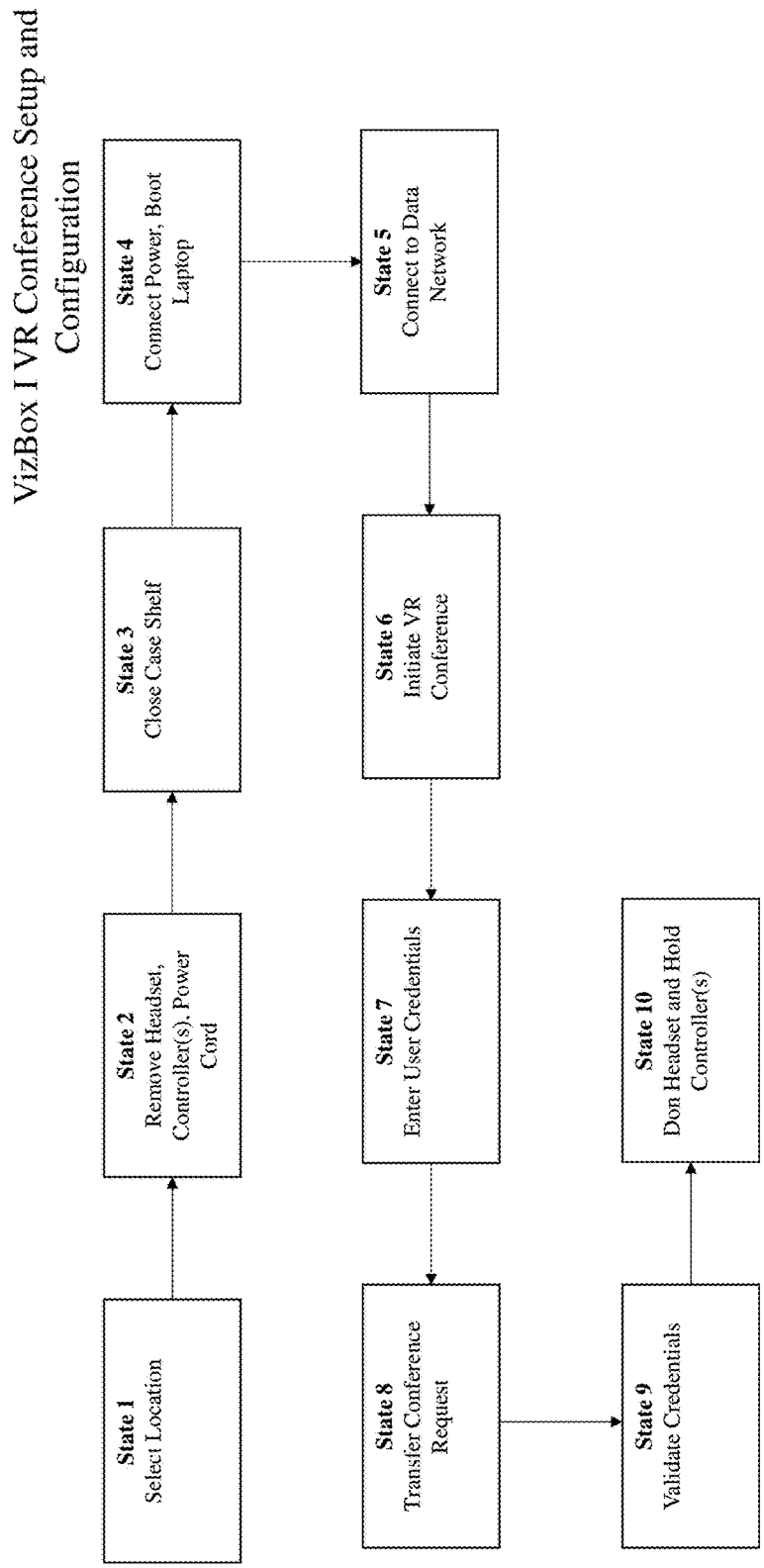
FIG. 8 illustrates an example process of configuring an all-in-one, portable, virtual reality system.

FIG. 8 illustrates an example process for setting up and/or configuring a portable VizBox I virtual reality system described herein. In this example setup, the user is accessing a multi-party virtual reality conference session. It is understood that the various steps may be performed in a different order, and fewer or additional steps may be performed. It is also understood that the components discussed below and in a portable kit are example components, and fewer, additional, or different components may be utilized. In addition, the dimensions and parameters discussed below are example dimensions and parameters, and other suitable dimensions and parameters may be used.

Block 1 of FIG. 8. The user selects a location (e.g., a room) to experience a virtual reality session. The user places the VizBox case on a table at one end of the selected room.

Block 2. The user opens the case, grabs the handle strap connected to the case shelf, and lifts the shelf upward. With the shelf in the open position, the user removes a headset (e.g., virtual reality head mounted display), a one or more hand-held controllers, and a power brick.

Block 3. The user places the power cord associated with the power brick and the cable associated with the headset in their respective cutout (which may be the same) and closes the case shelf.

Block 4. The user plugs the power brick into an AC power outlet, opens the laptop (in this example the computing device 110 used is a laptop computer), and selects the power control to power on the laptop. In this example, VR/AR software (e.g. PPT Studio software from WorldViz LLC of Santa Barbara) is installed on the laptop 110 and is configured to start automatically in response to a power on selection. The user waits until the laptop has finished a boot sequence and the VR/AR software starts.

Block 5. The user, via the laptop keyboard, connects the laptop to the Internet via a local Wi-Fi connection.

Block 6. The user, via the laptop keyboard, activates a pre-configured VR conference displayed control (e.g., double-clicks on a "Visible Attendees" desktop icon).

Block 7. The user, via the laptop keyboard, types a session ID in a session ID field and Nickname/Username in a Nickname field, followed by "Enter".

Block 8. The laptop requests, via the Internet data connection to a cloud-based VR conference, access to a VR conference.

Block 9. The credentials and session ID are validated by the VR conference moderator software and the VR conference is initiated.

Block 10. After entering the session ID and Nickname in Block 7, the user dons the VR headset and picks up the one or more hand-held controllers. The user is ready to begin the remote, interactive, VR session and waits for the moderator of the VR conference to arrive in the virtual session.

In this example setup described above, the user is participating in a multi-party virtual reality conference session. If the user's objective was to interact in a virtual reality simulation, fewer states then those described above need be performed. For example, if Block 6 launched a virtual reality simulation in response to the user selecting a displayed control associated with a virtual reality application, then Blocks 7-9 are skipped and the user dons the VR headset, picks up one or more hand-held controllers, and the simulation session begins.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A portable virtual reality kit, comprising:
a computing device;
a head mounted display comprising a first marker configured to emit a first repetitive pattern of infrared light pulses and a second marker configured to emit a second repetitive pattern of infrared light pulses wherein the first repetitive pattern of infrared light pulses and the second repetitive pattern of infrared light pulses are distinct from each other;
a handheld controller comprising a third marker configured to emit a third repetitive pattern of infrared light pulses wherein the third repetitive pattern of infrared light pulses is distinct from the first repetitive pattern of infrared light pulses and the second repetitive pattern of infrared light pulses;
a plurality of motion tracking cameras affixed to a portable case, wherein the plurality of motion tracking cameras are configured, at least in part, to communicate position data corresponding to detected infrared light to the computing device, and wherein the portable case is configured to receive at least the computing device, the head mounted display, and the handheld controller;
wherein upon computing device boot and without a user mechanically interconnecting the computing device to the plurality of motion tracking cameras and without a user calibrating the plurality of motion tracking cameras, the portable virtual reality kit is configured to:
receive, at the computing device, from the plurality of motion tracking cameras, position data corresponding to the first marker, position data corresponding to the second marker, and position data corresponding to the third marker;
using the first marker position data and the second marker position data, enable, at least in part, an orientation of a virtual reality scene to be rendered using the head mounted display; and
using the third marker, enable, at least in part, a representation of the handheld controller to be rendered using the head mounted display.

2. The portable virtual reality kit of claim 1, wherein the display of the handheld controller is positioned in the display corresponding to a distance derived from the first marker, second marker, and third marker positions.

3. The portable virtual reality kit of claim 1, wherein the portable virtual reality kit is sized to enable a user to carry the portable virtual reality kit on an airplane.

4. The portable virtual reality kit of claim 1, wherein the computing device is preconfigured with one or more simulations.

5. The portable virtual reality kit of claim 1, wherein the computing device is preconfigured to automatically receive application software upgrades.

6. The portable virtual reality kit of claim 1, wherein the third marker is attached to or included as a component of the handheld controller.

7. The portable virtual reality kit of claim 1, wherein the portable virtual reality kit is configured to derive an identity of a marker from a detected repetitive pattern of infrared light pulses.

* * * * *